Patented Feb. 20, 1951

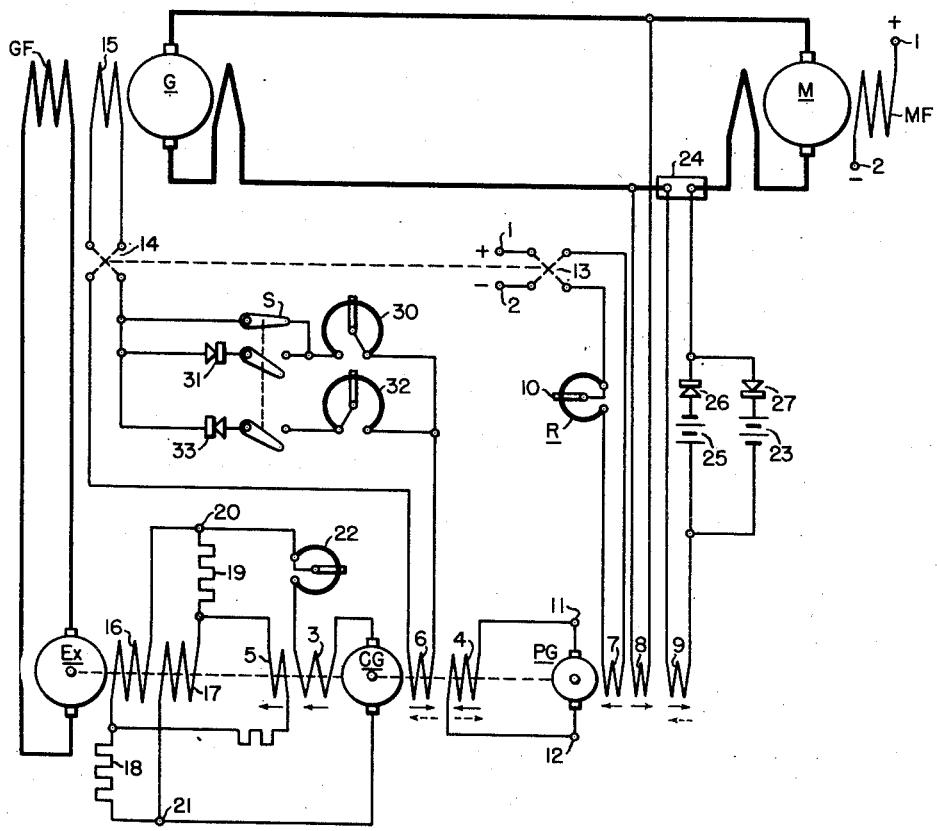

2,542,843

UNITED STATES PATENT OFFICE 2,542,843

CONTROL SYSTEM FOR DYNAMOELECTRIC MACHINES

Norman Harry Shaw, Stafford, England, assignor to The English Electric Company Limited, London, England, a British company Application September 29, 1949, Serial No. 118,576
In Great Britain October 18, 1948

6 Claims. (Cl. 318—158)

1

My invention relates to electric systems of control for dynamo-electric machines and more particularly to systems of control, generally of the Ward-Leonard type, for controlling the speed and other operating characteristics of a direct current motor, the control being such as to vary the voltage of a variable voltage generator connected to a motor operating a load.

One broad object of my invention is to limit the rate of acceleration of a motor substantially independent of the speed of operation of the acceleration control.

Another broad object of my invention is to limit the rate at which a direct current motor can change its speed.

A somewhat specific object of my invention is the provision of a speed controlling effect on a direct current motor that is a function of the actual motor speed and the speed setting of the speed control.

A more specific object of my invention is the provision of changing the excitation of a main generator operating a motor from an exciter having two opposing field windings excited respectively in accordance with the motor speed and the speed selection made by the speed control apparatus.

It is also an object of my invention to automatically limit the rate of speed change of a direct current motor to a selected value independent of the rate of movement of a speed control member above a selected speed and to make the rate of speed change of the motor a function of the speed of movement of the speed control member for all speeds below said selected speed.

Other objects and advantages will become more apparent from a study of the following specification and the single figure showing diagrammatically the features of my invention.

In the figure, M designates the main load-operating motor and constituting the motor, the operation of which is to be controlled, and G designates the main generator supplying the electric energy to the main motor by the loop circuit shown.

The field winding MF of the motor M is supplied from a source of constant potential evidenced by the terminals 1 and 2. The motor field may be provided with a field rheostat as is usual practice, but since such control is no part of my invention, it has not been shown. The excitation for the motor M may be considered as constant.

The field winding GF of the main generator G

2 is supplied with excitation from the exciter Ex which is in turn excited from the amplifying, or control, generator CG. The amplifying generator CG is controlled in its excitation from its own voltage through field 3, and from the voltage of the pilot generator PG through field 4. The control generator is supplied with two other fields 5 and 6, the utility of which will be explained hereinafter.

The pilot generator PG has its armature connected in a loop circuit with the field winding 4, and is itself provided with three field windings 7, 8 and 9.

The control generator CG is a tuned direct current generator arranged to operate on the straight portion of its magnetization characteristic and be self-exciting with not more than relatively a very little other excitation to thus be highly sensitive in response to any small change of its other excitation.

The tuned generator as above pointed out is supplied with excitation from the pilot generator PG through the field 4. The pilot generator is supplied with two opposing windings. One of the windings, as winding 7, hereinafter referred to as the control winding, is excited from the main source of constant direct current potential through the field rheostat R serving as the motor speed control, or speed regulator and the other winding 8, hereinafter referred to as the speed sensitive winding, is connected across the motor input terminals. The characteristics of the pilot exciter, or generator, are so chosen that the exciter PG saturates at approximately 10% of normal maximum, or 100% excitation and has a flat voltage characteristic between 10% and 100% of the excitation due to the speed control winding.

For rapid movement of the controller R to increase the motor speed, as by a rapid movement of arm 10 to the left, the pilot exciter PG will saturate and thus have a limited positive and negative polarity at its output terminals 11 and 12, respectively, and for a rapid movement of the arm 10 to the right to decrease the motor speed, the pilot generator will saturate and thus have a limited negative and positive polarity at its output terminals 11 and 12, respectively, due to the excess of excitation from the speed sensitive winding 8. For steady speed operation at any speed selected by the speed regulator R, the pilot generator output voltage will be approximately zero.

Stated in general terms, the control effect of the pilot generator operates to impose a predetermined limit on the rate of acceleration and the rate of deceleration of the motor M independent of the speed with which the arm 10 of the speed regulator R is moved. The system also operates to maintain the motor speed substantially constant when the motor M has attained the desired speed. This will become more clear from a more detailed discussion of the operation of my system given hereinafter.

To effect reversal of the motor M, the control field 7 is connected to the terminals 1 and 2 through the reversing switch 13. This switch is preferably ganged with the reversing switch 14 in the circuit of the acceleration control field 15.

The third field winding of the pilot generator, that is, field winding 9 provides protection against overcurrent in the motor generator loop circuit shown when such protection is desired. Often this protection is not needed in which case the field winding 9 and the elements of the circuit interconnecting this field winding 9 with the loop circuit are not included in my system of control.

When the field 9 is included, the control also includes an opposing voltage bias, or battery 23 in circuit with the field winding 9 so that this winding is only energized when the load current in the loop circuit, as measured by the voltage drop across shunt 24, say from right to left, exceeds the bias voltage of the battery 23. If the overcurrent protection is to provide for both motoring operation of motor M and generating operation of motor M, then an additional battery, or voltage bias 25 and two rectifiers 26 and 27 may be used. If the voltage drop is from left to right across the shunt 24, then the voltage bias 25 and rectifier 26, in conjunction with field 9, provide the overcurrent protection, and when the voltage drop is from right to left across shunt 24, then the voltage bias 23 and rectifier 27, in conjunction with field 9, provide the overcurrent protection.

The main exciter Ex, the control generator CG, and the pilot generator PG, are all driven at substantially constant speed by individual motors or from a single motor or common drive shaft as shown.

The main field winding of the exciter Ex is divided into two equal sections 16 and 17, which are arranged as opposite arms of a bridge. The bridge is completed by resistors 18 and 19, the resistance values of which are equal to those of the field windings 16 and 17 when cold.

By its corners 20 and 21, the bridge circuit is connected to the output terminals of the control generator CG through the adjustable resistor 22 and the field winding 3. This winding 3 constitutes the self-exciting winding for the control generator.

The control generator has the control windings 4, 5 and 6. The control winding 4, of course, provides the effect responsive to the motor speed through the action of the speed responsive winding 8. When the control winding 9 is used, then the effect of winding 4 will be a function of the motor speed and the load current of the motor.

The field winding 5 compensates for temperature changes of the field windings 16 and 17 and stabilizes the tuning of the control generator CG. As the field windings 16 and 17 warm up their resistance rises, because these windings are wound with the usual copper wire; but the resistors 18 and 19 are made of resistance wire having a very low or negligible temperature coefficient of resistance, such as nickel-chrome alloy. A very useful material for these resistors 18 and 19 would also be one having a selected negative temperature coefficient, as for example, the material disclosed in the United States Patent No. 1,822,742.

In the absence of the bridge circuit and the compensating winding 5, an increase of resistance in the load circuit of generator CG tends to diminish the degree of self-excitation provided by the series field winding 3.

In my arrangement as the resistances of the field windings 16 and 17 rise relative to the resistors 18 and 19 with an increase in temperature, the bridge becomes unbalanced, and in consequence the field winding 5 is excited in accordance with the unbalance. The winding 5 is so designed and adjusted that it will provide just the necessary boost to the self-excitation provided by the series field 3 to maintain the generator CG in tune, as the resistance of its load increases with a rise in temperature.

Since the control generator CG is very sensitive to the excitation provided by the windings other than the field winding 3, it is apparent that any change in the excitation currents in the field windings 4, 5 and 6 will be immediately reflected by a change in the output voltage of the exciter Ex and thus the output voltage of the generator G.

If the field change in the field winding GF is too rapid, a current will be induced in the field winding 15 to provide a negative feedback to the control generator CG. In consequence, field winding 6 will produce an effect that is always negative with respect to the field change in winding GF. The end result is that the motor acceleration will be limited, and controlled, to fall within a rate desired. If the switch S is in the position shown, the rheostat 30 is used to adjust the degree of feedback and thus the rate of acceleration of the motor M.

Different rates of acceleration and deceleration may be obtained by inserting a blocking rectifier, as the rectifier 31, in the circuit with the rheostat 30 in one direction. A further rheostat, as 32, and oppositely connected rectifier 33 connected in parallel to the rheostat 30 and rectifier 31, provide for different degrees of feedback for flux changes of opposite sense in the main generator field GF.

Since the novel results of my invention, particularly after having had the benefit of my teachings, may, by those skilled in the art, be obtained by other circuit arrangements, the foregoing description is to be considered merely illustrative of my invention and not to be taken in a limiting sense.

I claim as my invention:

1. In a system of control for a direct current motor, in combination, a direct current motor having a field winding in use energized at a selected value, a direct current generator connected in a loop circuit with the motor, a field winding for the generator, an exciter connected to energize the generator field winding, a speed regulator, means for varying the voltage of said exciter as a function of the speed of adjustment of the speed regulator for all speed of adjustment below a selected speed, and means responsive to the motor speed for limiting the rate of change of exciter voltage for all speeds of adjustment of the speed regulator above said selected speed.

2. In an electric system of control for a direct current motor, in combination, a direct current motor, a field winding for said motor, said field winding in use being energized at any selected value, a direct current generator connected in a loop circuit with the direct current motor, a field winding for the generator, an exciter connected in a loop circuit with the field winding of the generator, a speed regulator for varying the voltage of the exciter in accordance with the speed of movement of the regulator, and means responsive to the motor speed connected to coact with said speed regulator for limiting the rate of voltage change of said exciter for all speeds of movements of the speed regulator greater than a selected speed.

3. In an electric system of control for a direct current motor, in combination, a direct current the operation of which is to be controlled, a field winding for said motor, said field winding, in use, being energized at any selected value, a direct current generator connected in a loop circuit with the motor, a field winding for the generator, an exciter connected in a loop circuit with the field winding of the generator, a speed regulator for varying the voltage of the exciter in accordance with the speed of movement of the regulator, means responsive to the speed of the motor and operatively interconnected with the speed regulator, for limiting the voltage variation of the exciter when the speed of operation of the speed regulator is above a selected speed, motor acceleration control means responsive to the rate of change of the current in the generator field winding for also limiting the voltage variation of the exciter, and overcurrent control means responsive to the load current of said motor for also limiting the voltage variations of the exciter.

4. In an electric system of control for a direct current motor, in combination, a direct current the operation of which is to be contolled, a field winding for said motor, said field winding, in use, being energized at any selected value, a direct current generator connected in a loop circuit with the motor, a field winding for the generator, an exciter connected in a loop circuit with the field winding of the generator, a speed regulator for varying the voltage of the exciter in accordance with the speed of movement of the regulator, means responsive to the speed of the motor and operatively interconnected with the speed regulator, for limiting the voltage variation of the exciter when the speed of operation of the speed regulator is above a selected speed, motor acceleration control means responsive to the rate of change of the current in the generator field winding for also limiting the voltage variation of the exciter, overcurrent control means responsive to the load current of said motor for also limiting the voltage variations of the exciter, and means for changing the effect of said overcurrent control means for different directions of the load current in the loop circuit including the generator and the motor.

5. In an electric system of control for a direct current motor, in combination, a direct current the operation of which is to be controlled, a field winding for said motor, said field winding, in use, being energized at any selected value, a direct current generator connected in a loop circuit with the motor, a field winding for the generator, an exciter connected in a loop circuit with the field winding of the generator, a speed regulator for varying the voltage of the exciter in accordance with the speed of movement of the regulator, means responsive to the speed of the motor and operatively interconnected with the speed regulator, for limiting the voltage variation of the exciter when the speed of operation of the speed regulator is above a selected speed, motor acceleration control means responsive to the rate of change of the current in the generator field winding for also limiting the voltage variation of the exciter, overcurrent control means responsive to the load current of said motor for also limiting the voltage variations of the exciter, and means for changing the effect of said acceleration control means in accordance with polarity sense of the changes in generator excitation.

6. In an electric system of control for a direct current motor, in combination, a direct current the operation of which is to be controlled, a field winding for said motor, said field winding, in use, being energized at any selected value, a direct current generator connected in a loop circuit with the motor, a field winding for the generator, an exciter connected in a loop circuit with the field winding of the generator, a speed regulator for varying the voltage of the exciter in accordance with the speed of movement of the regulator, means responsive to the speed of the motor and operatively interconnected with the speed regulator, for limiting the voltage variation of the exciter when the speed of operation of the speed regulator is above a selected speed, motor acceleration control means responsive to the rate of change of the current in the generator field winding for also limiting the voltage variation of the exciter, overcurrent control means responsive to the load current of said motor for also limiting the voltage variations of the exciter, means for changing the effect of said overcurrent control means for different directions of the load current in the loop circuit including the generator and the motor, and means for changing the effect of said acceleration control means in accordance with polarity sense of the changes in generator excitation.

NORMAN HARRY SHAW.

REFERENCES CITED

The following references are of record in the file of this patent:

UNITED STATES PATENTS

| Number | Name | Date |
| --- | --- | --- |
| 1,708,747 | Whiting | Apr. 9, 1929 |